UNITED STATES PATENT OFFICE.

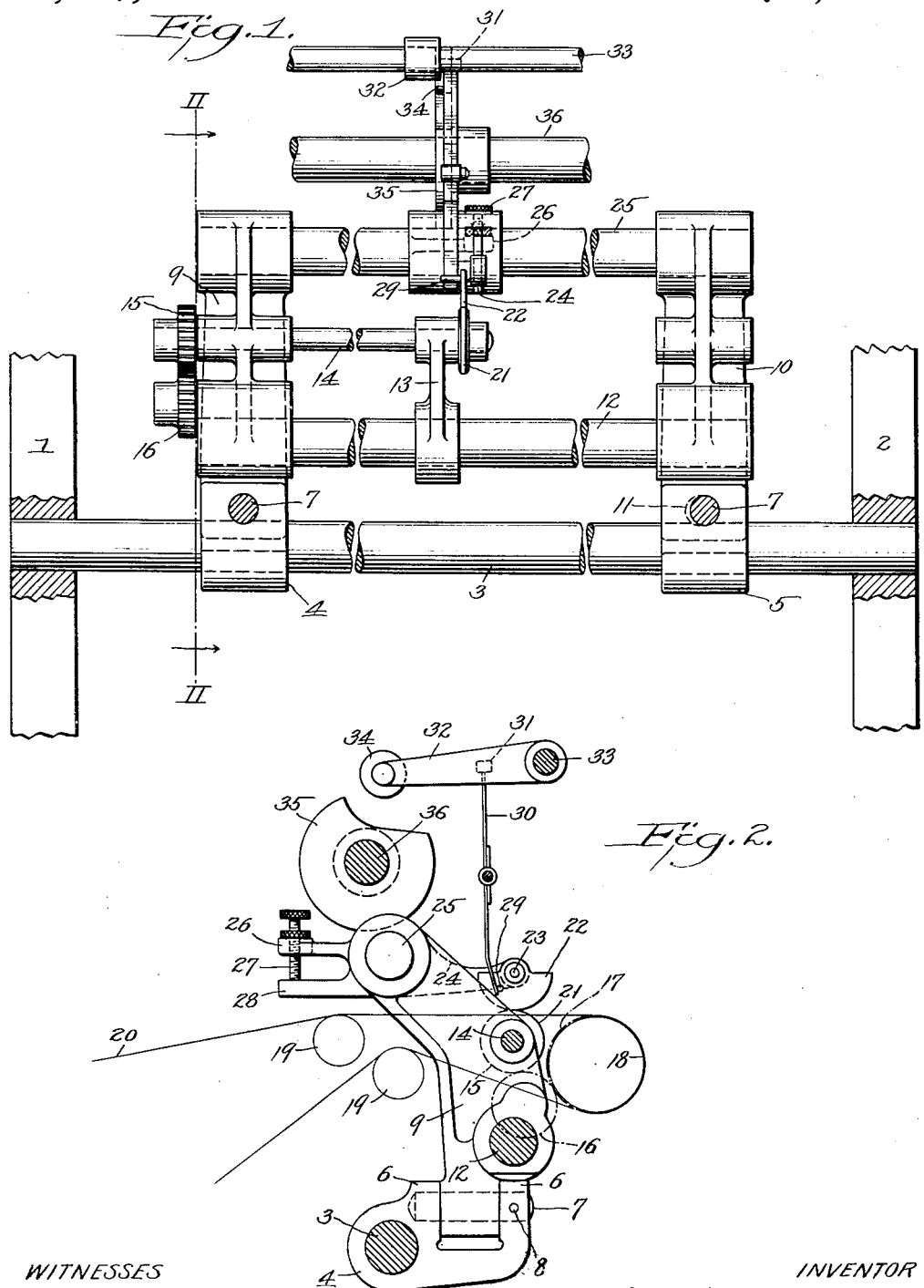

CARL E. CHRISTOPHEL, OF PEARL RIVER, NEW YORK, ASSIGNOR TO DEXTER FOLDER COMPANY, OF PEARL RIVER, NEW YORK, A CORPORATION OF NEW YORK.

SHEET-FEEDING MACHINE.

1,347,893.   Specification of Letters Patent.   Patented July 27, 1920.

Application filed March 14, 1919. Serial No. 282,580.

*To all whom it may concern:*

Be it known that I, CARL E. CHRISTOPHEL, a citizen of Germany, residing at Pearl River, in the county of Rockland and State of New York, have invented certain new and useful Improvements in Sheet-Feeding Machines, of which the following is a specification.

This invention relates to sheet feeding machines and contemplates improved means for mounting a sheet calipering device. At the present time it is common practice to employ at least two calipering devices arranged on opposite sides of the feeding machine. In consequence it has always been found necessary to adjust the positions of these sheet calipering devices every time the machine is prepared for feeding sheets of a different size than those for which the calipers have been set. The present invention contemplates the use of but a single calipering device which is permanently arranged at or near the central vertical plane of the machine. Toward the attainment of this object, means are provided for avoiding certain undesirable conditions which are likely to arise in the relations between the sheet calipering elements and which conditions are produced by bowing or other deformation of the stay shaft which carries the calipering device. Such defects are produced by heavy loads of paper which are ordinarily suspended between the side frames of the machine as well as by power strains to which the machine is subjected. For overcoming these difficulties, my invention has for an object to provide improved means for supporting the calipering device and by means of which any bowing or other deformation in shafts or other parts by which the calipering device is supported, will not be transmitted to the calipering elements in such a way as to render them inaccurate in operation.

In the drawings,

Figure 1 is a rear elevation of my improved caliper mounting means, parts being broken away and parts shown in section;

Fig. 2 is a section on the line II—II, Fig. 1.

In the embodiment of my invention shown in the drawings, the side frames 1 and 2 of a sheet feeding machine are connected by a stay shaft 3. Laterally spaced upon the stay shaft 3 are bracket bearings 4 and 5, each of said bracket bearings being provided with oppositely disposed branches 6 within which is mounted a pin or pivot 7 which is retained in position by a pin 8. Pivotally mounted upon the pin 7 is a caliper supporting bracket 9. On the pivot 7 of the right hand bearing 5 according to Fig. 1, a bracket arm 10 is pivotally mounted, but around said pivot 7, the bracket 10 is provided with an elongated slot 11 which permits a sliding movement in connection with the slight pivotal movement. Journaled within the brackets 9 and 10, is a shaft 12 which carries an arm 13 in the upper end of which is journaled one end of a rotary shaft 14. The other end of said shaft 14 is journaled in the bracket 9 and is provided on its outer end with a gear 15 which meshes with another gear 16 which is journaled on a pin carried by the bracket 9 and meshes with a drive gear 17 which rotates with the feed roll 18. Passing around the feed roll 18 and guide rollers 19 are a plurality of feed tapes 20. Secured to the inner end of the shaft 14 is a calipering wheel or element 21 which coöperates with a calipering element 22 pivoted at 23 in one arm 24 of a lever which pivots on a shaft 25, said shaft 25 being mounted in the upper ends of brackets 9 and 10. Said lever is provided with an arm 26 which carries an adjustment screw 27 which bears against an arm 28 which is secured to the shaft 25 and serves as an abutment for adjusting the position of the calipering elements 21 and 22. A laterally projecting pin 29 which is carried by the upper calipering element 22 is adapted to displace the pendulum 30 which normally engages a lug 31 which projects from a cam lever arm 32. Said lever arm 32 is keyed to a shaft 33, said shaft 33 when oscillated serving to actuate a clutch which cuts off power from the machine and causes it to come to rest. On the outer end of arm 32 is journaled a cam roller 34 which coöperates with a cam 35 at such times when the pendulum 30 releases the arm 32. It will be seen therefore, that under these conditions, the cam roller 34 drops into the recess in cam 35 and thus brings the machine to rest. The cam 35 is mounted on a cam shaft 36. The advantages of this construction will be readily understood and briefly related are as follows.

Calipering elements 21 and 22 are mounted in constant relation to each other within the brackets 9 and 10, the said brackets being pivotally connected to the stay shaft 3 adjacent the side frames 1 and 2. It will be seen therefore that in the event of said stay shaft being bowed by reason of the weight of a pile of sheets supported between the said frames 1 and 2, or if said stay shaft is deformed in any other respect, the pivotal connection of one bracket 9 and the combined pivotal and sliding connection of the other bracket 10 therewith will prevent any such distortion being transmitted to the calipering elements. This construction therefore serves to maintain the calipering elements 21 and 22 in constant relation to each other so that their operation is uniform under all conditions.

I claim:

1. In a sheet feeding machine, a feeder frame, sheet feeding means, a sheet calipering device comprising coöperating calipering elements and means for supporting said calipering device from said frame, said supporting means including laterally spaced movable joints whereby said elements are maintained in substantially constant relation to each other and the calipering device as a whole is permitted to adjust its position with respect to said frame.

2. In a sheet feeding machine, the combination with side frames, of a stay shaft connecting said side frames, a calipering device, and means movably connected to said stay shaft at points spaced along said stay shaft for supporting said calipering device, said supporting means being adapted by its movable connections with said stay shaft to neutralize effects due to deformations in said stay shaft.

3. In a sheet feeding machine, side frames, a stay shaft connecting said side frames, laterally spaced brackets mounted on said stay shaft and angularly movable with respect thereto, and sheet calipering elements journaled in said brackets.

4. In a sheet feeding machine, side frames, a stay shaft connecting said side frames, a bracket pivotally connected to said stay shaft adjacent each of said side frames, caliper shafts journaled in said brackets, and sheet calipering elements mounted on said caliper shafts.

5. In a sheet feeding machine, the combination with side frames or supports, of caliper brackets movable on axes adjacent said side frames respectively, caliper shafts journaled in said brackets, and sheet calipering elements carried by said shafts.

6. In a sheet feeding machine, caliper supporting brackets movable about laterally spaced axes, caliper shafts journaled in said brackets, and calipering elements carried by said shafts.

7. In a sheet feeding machine, caliper supporting brackets movable about laterally spaced axes, caliper shafts journaled in said brackets, and calipering elements carried by said shafts one of said brackets being provided with means permitting a limited movement of its axis relative to the axis of the other bracket.

8. In a sheet feeding machine, side frames, a stay shaft connecting said side frames, laterally spaced bracket bearings mounted on said stay shaft, caliper brackets pivotally mounted on one of said bearings, caliper shafts journaled in said brackets, and sheet calipering elements mounted on said caliper shafts.

9. In a sheet feeding machine, side frames, a stay shaft connecting said side frames, a caliper bracket disposed adjacent one of said side frames and having pivotal connection with said stay shaft, a caliper bracket disposed adjacent the other of said side frames and having a combined sliding and pivotal connection with said stay bolt, caliper shafts journaled in said brackets, and sheet calipering elements mounted on said caliper shafts.

10. In a sheet feeding machine, side frames, caliper supporting brackets oscillatable about relatively adjustable axes, caliper shafts journaled in said brackets, and paper calipering elements mounted on said caliper shafts.

CARL E. CHRISTOPHEL.